Dec. 17, 1968   R. T. HEADRICK   3,416,762
RESTRAINING MEANS FOR PILLOW TANKS
Filed Feb. 20, 1967   3 Sheets-Sheet 1
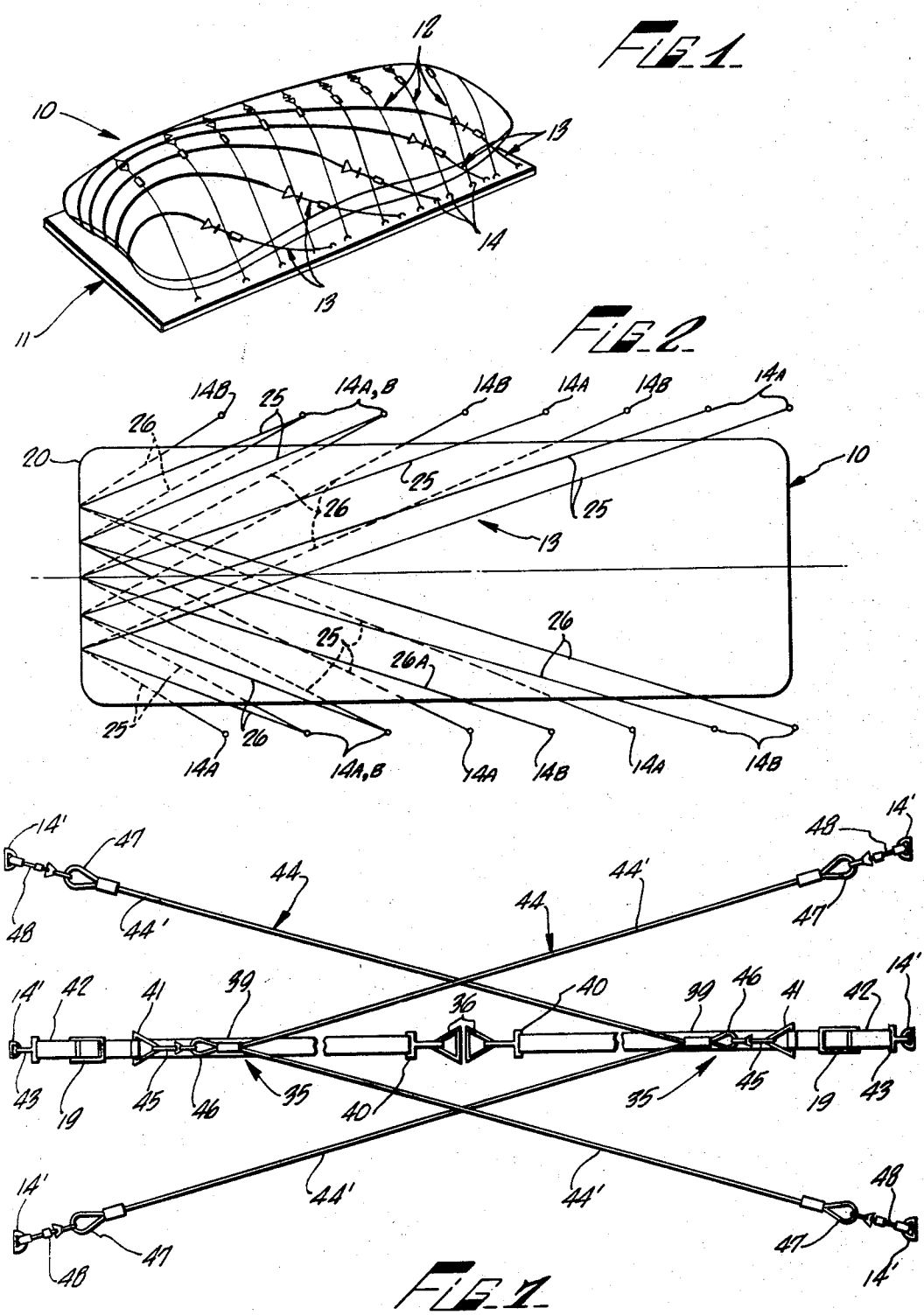

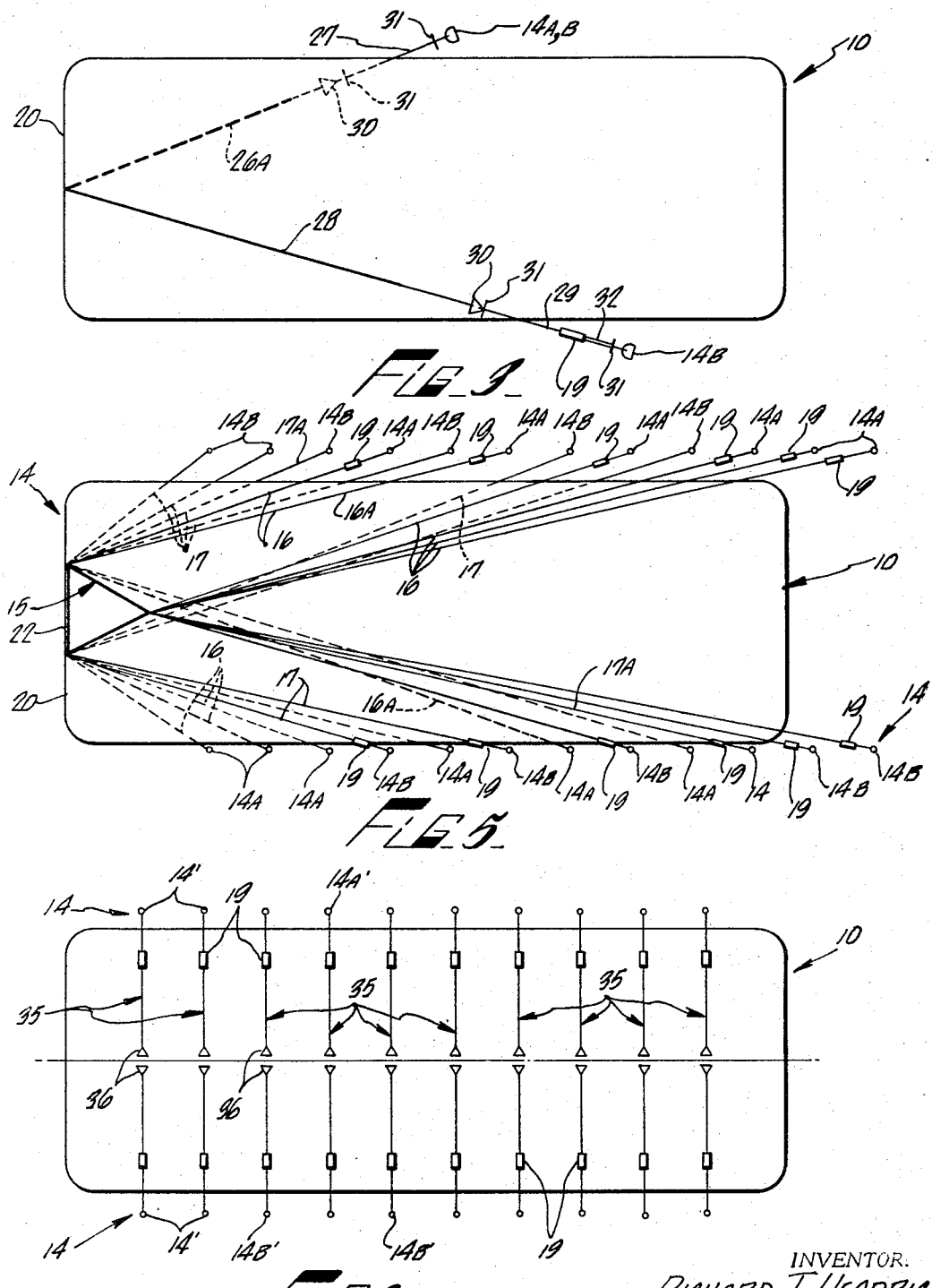

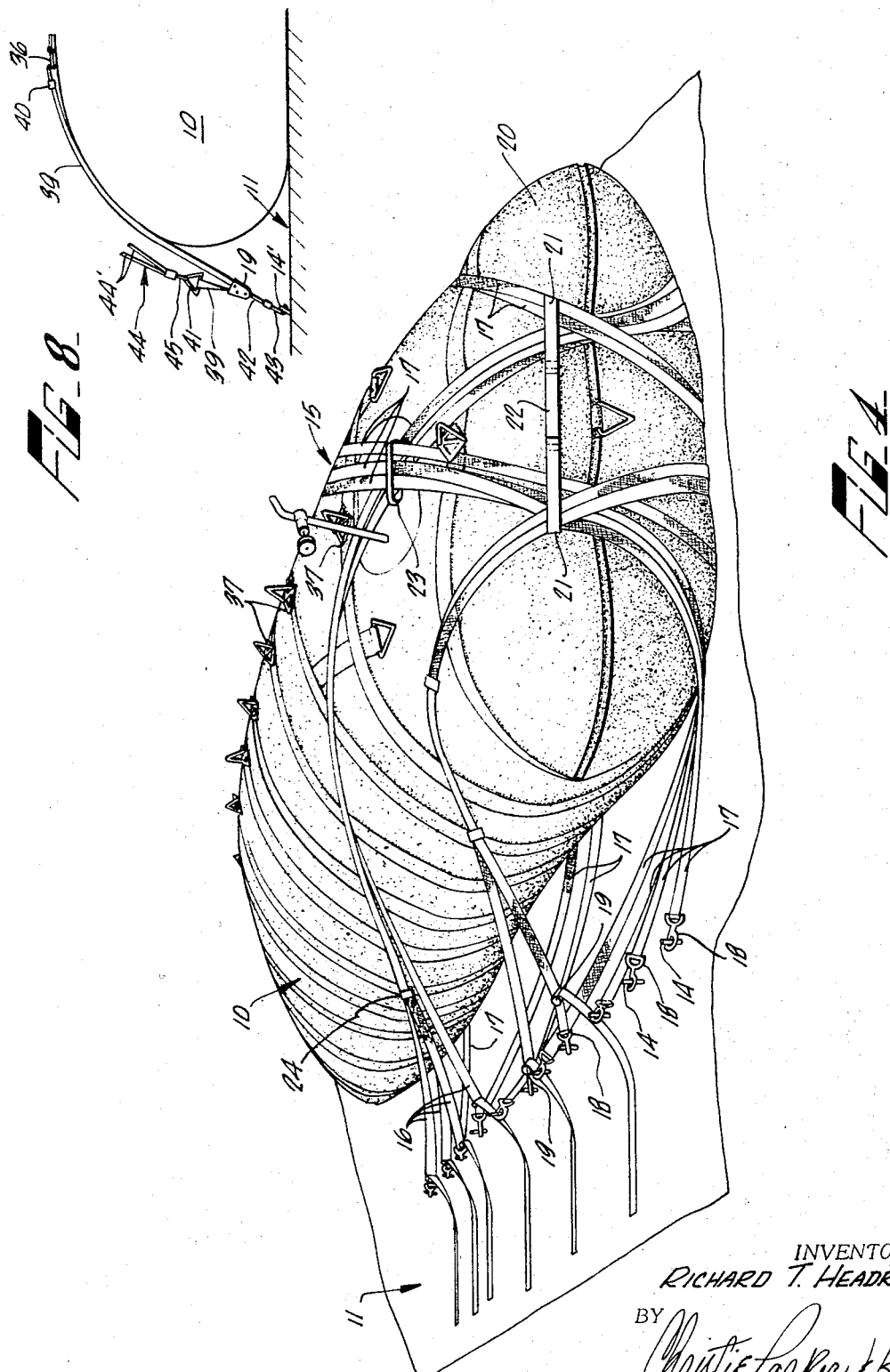

United States Patent Office 3,416,762
Patented Dec. 17, 1968

3,416,762
RESTRAINING MEANS FOR PILLOW TANKS
Richard T. Headrick, 916 Crestfield Drive,
Duarte, Calif. 91010
Filed Feb. 20, 1967, Ser. No. 617,333
17 Claims. (Cl. 248—361)

ABSTRACT OF THE DISCLOSURE

A crash harness and a surge-resisting tie-down arrangement for pillow tanks in transport vehicles. The harness includes a plurality of equi-length straps which crisscross each other from opposite sides of the tank in extending from a tank supporting bed forwardly over the tank, around the front end of the tank, and rearwardly under the tank to their other connections to the bed. The tie-down arrangement is duplicated at each of a number of stations spaced along the tank. At each station a strap is connected from the top center of the tank and is passed through a one-way pulley, connected to the bed laterally of the station, and back over the tank to an extensible strap tensioning device connected between the other end of the strap and the bed adjacent the opposite side of the tank. The tensioning device is arranged so that it is extended from its relaxed state, and thereby applies tightening tension to the strap, throughout a wide range of fullness conditions of the tank.

Field of the invention

This invention relates to cargo handling. More particularly, it relates to arrangements for restraining pillow tanks from movement relative to supporting beds for the tanks in transport vehicles.

Background of the invention

Collapsible liquid storage tanks of high gallonage capacity and fabricated of rubberized fabric are now used with increasing frequency. Such tanks are familiarly known as "pillow tanks" in view of their pillow- or sausage-like configuration when filled. In the past, because of the problems attendant to movement of full or partially full pillow tanks, such tanks have been used primarily in permanent and semi-permanent installations where their transportability is not important.

Pillow tanks obviously could be of great value to the military, particularly in support of tactical or brush-fire warfare situations, as water or fuel storage units, for example. The difficulties attendant to the movement of full or partially full pillow tanks, however, has militated against the most effective use of such tanks. One problem associated with the transportation of pillow tanks, particularly where the tank is to be moved by air, lies in the likelihood that the tank can tear loose from its supporting bed in the event of a crash of the vehicle. An aircraft may crash without catching fire or without significant injury to the personnel on board. However, if a fuel-filled pillow tank is on board and a crash occurs, it is not at all uncommon for the tank to burst as a result of the crash loads imposed upon it and for the spilled fuel to catch fire, thereby producing damage and injury where none would otherwise occur to any appreciable extent.

Also, pillow tanks could be used advantageously by the military and others to extend the useful range of transport vehicles. For example, helicopters have a relatively small operating range because of the limited fuel capacity of such craft. Pillow tanks could be used as an additional on-board fuel supply to extend the operating range of the aircraft as is necessary in many cases where helicopters must be ferried from point to point. In the past, however, the problem of surges in partially full pillow tanks has impeded the use of such tanks as a ferry range extension device for aircraft.

Features of this invention

This invention provides a simple, effective and efficient system for restraining pillow tanks relative to supporting beds for the tanks in transport vehicles. The benefits of the invention are particularly significant in enhancing the utility of pillow tanks in connection with aircraft, particularly in helicopters.

The system provides a harness for restraining a pillow tank from bodily movement relative to a supporting bed in a transport vehicle during a crash of the vehicle. Also, the system provides a tie-down arrangement which is particularly useful in adapting a pillow tank to ferry range extension applications for aircraft. In this latter respect, the tie-down arrangement has particular utility in combination with the pillow tank surge damping baffle structure described in my United States Patent 3,288,186 issued Nov. 29, 1966. The tie-down arrangement supplements these surge baffles.

Summary of the invention

This invention provides a harness for securing a pillow tank from bodily movement relative to a supporting bed during a crash of a tank transport vehicle. Preferably, the tank supporting bed carries fitting devices at locations spaced along the length of the tank adjacent the opposite sides of the tank. The harness includes first and second pluralities of moderately elastic, high strength straps of substantially equal length. Preferably, the straps are made of woven nylon. Coupling means are connected to each end of each strap and are arranged to cooperate with the fitting devices for securing the straps to the bed. When the inventive structure is in use, each strap is connected at one end to a selected fitting device and is passed along the top of the tank and around that end of the tank which is the front end in an anticipated crash of the vehicle. Each strap is then passed from the front end of the tank under the tank to connection of its other end to another selected fitting device. The straps of the first plurality have their one ends connected to separate fitting devices adjacent one side of the tank, while the straps of the second plurality have their one ends connected to separate fitting devices adjacent the other side of the tank. Because the straps are of essentially equal length, in the event of a crash, the load of the tank as it tends to move relative to its supporting bed is distributed uniformly throughout the several straps and is transferred to spaced locations of the bed.

Also this invention provides a pillow tank tie-down arrangement; the tie-down arrangement is very useful with respect to a pillow tank used as an aircraft ferry range extension fuel tank. Such structure is used with a pillow tank having a plurality of connecting devices secured to a top exterior surface of the tank at longitudinally spaced locations along the center of the tank. Also, the bed adjacent each side of the tank defines a plurality of connection points spaced along the tank. The tie-down arrangement includes a plurality of relatively inelastic straps and coupling means at one end of each strap for connecting the strap to a respective one of the tank-mounted coupling devices. A one-way pulley unit is engaged with each strap at a location along the strap spaced from the strap one end and intermediate the ends of the strap. Each pulley unit is arranged to permit the unit to move relatively along the strap engaged therewith only toward the one end of the strap. Also, means are provided for connecting each pulley unit to a respective first selected connection point substantially laterally of that tank-mounted connecting device to which the corresponding strap is engaged. Elongate elastic means are connected to the other end of each strap and extend from the strap over the tank away from the pulley unit associated with the strap. Further, means are provided for connecting the ends of the elastic means opposite from the straps to selected second connection points. The second connection points are located adjacent the side of the tank which lies opposite from the first selected connection point associated with the strap. The lengths of the straps and the elastic means connected to them are selected so that the elastic means must be substantially extended from their relaxed states in order to be passed over a full pillow tank for connection to the bed at the appropriate second selected connection points. As the contents of the tank are extracted from the tank, the elastic means contract, thereby causing the straps connected thereto to pass through the respective pulley units.

*Brief description of the drawing*

The above-mentioned and other features of this invention are more fully set forth in the following detailed description of presently preferred embodiments of the invention, which description is presented with reference to the accompanying drawing wherein:

FIG. 1 is a perspective view of a pillow tank secured to a supporting bed by structure according to this invention;

FIG. 2 is a schematic representation of a crash restraining harness for a pillow tank;

FIG. 3 is a more detailed schematic representation of a portion of the harness depicted in FIG. 2;

FIG. 4 is a perspective view of a pillow tank and another form of crash restraining harness;

FIG. 5 is a schematic representation of a pillow tank provided with a crash restraining harness of the type illustrated in FIG. 4;

FIG. 6 is a schematic illustration of the ferry range extension tie-down apparatus provided by this invention;

FIG. 7 is a detailed plan view of the tie-down structure applied to a pillow tank at one of the longitudinal stations indicated in FIG. 6; and FIG. 8 is a fragmentary elevation view of a portion of the tie-down arrangement shown in FIGS. 6 and 7.

*Description of the preferred embodiments*

As depicted in FIG. 1, an elongated pillow tank 10 filled with aviation fuel, for example, is supported on a bed 11. The bed may be either a special pallet for receiving the tank and adapted to be mounted in a transport vehicle, or a portion of the structure of a transport vehicle. For example, bed 11 could be the cargo floor of a helicopter. The pillow tank is secured to the bed by a surge-resistant tie-down arrangement 12 and by a crash harness 13. The bed at spaced locations along both sides of the tank is provided with suitable fittings 14 defining connection points for the structure of the surge-resisting tiedown arrangement and the crash harness.

FIGS. 4 and 5 illustrate a crash harness 15 which is structurally somewhat different from crash harness 13 illustrated in FIG. 1, but which utilizes the same operative principles as harness 13. Harness 15 is comprised of a first group of elongate, moderately elastic straps 16 and a second group of such straps 17. All of the straps in both the first and second groups are of substantially the same length. Preferably, the straps are made of woven nylon webbing such as 5000 pound test, 1½ inch woven nylon webbing manufactured by Aeroquip Corporation, Jackson, Mich. Nylon strapping is moderately elastic as compared to woven steel strapping, on the one hand, or to Bonjii cording, on the other hand.

Each end of each of straps 16 and 17 is provided with a coupling member 18 by which the straps may be connected to suitable ones of fittings 14. Preferably, the fittings carried by the tank receiving bed are eyes, hooks, or rings securely connected to the bed. Coupling members 18 preferably are hooks provided with suitable retaining spring-load latches as, for example, Aeroquip Corporation catalog items 3040A.

Adjacent one end thereof each strap 16 and 17 is threaded through releasable, spring-loaded one-way strap clutch device 19. The clutch devices preferably are Aeroquip Corporation catalog items 31101 and commonly are known as R buckles; in their operative modes these devices permit the strap engaged therewith to move only in one direction relative to the device. The clutch devices are releasable so that the strap may be passed in the opposite direction through the clutch device when the devices are placed in their inoperative modes. As illustrated in FIG. 4, each clutch device is located adjacent one of the coupling members 18 carried by the corresponding strap, and the strap between the clutch device and the adjacent coupling member 18 is bent double upon itself. Each clutch device is engaged with its strap so that, in the operative mode of the clutch device, the effective length of the strap between its coupling members 18 can be reduced but not increased.

Each of straps 16 and 17 is connected between selected pairs of fittings 14, one fitting of each pair being located adjacent one side of the tank and the other fitting of the pair being located adjacent the other side of the tank. With reference to FIG. 4 which is a front perspective view of tank 10 and harness 15, each of straps 16 is passed from connection with a selected one of fittings 14 adjacent the left side of the tank, over the top of the tank to tank front end 20 where the straps pass through loops 21 formed at opposite ends of a keeper or positioning strap 22. From the keeper strap, straps 16 pass over the front end of the tank and then under the tank to selected ones of fittings 14 adjacent the right side of the tank.

The arrangement of the various ones of straps 16 and 17 are illustrated best in FIG. 5 which is a schematic top plan view of the structure shown in FIG. 4. In FIG. 5, those of fittings 14 associated with straps 16 are designated as fittings 14A, while the fittings associated with straps 17 are designated as fittings 14B. Where the straps pass under the tank, the straps are represented by dashed lines. Six straps 16 and six straps 17 are provided in harness 15. Accordingly, twelve fittings 14A and twelve fittings 14B are provided at spaced selected locations on the bed for the tank. Strap 16A, the strap connected to the second one of fittings 14A proceeding rearwardly along the left side of tank 10 (the top edge of the tank as viewed in FIG. 5), is passed over the top of the tank to keeper strap 22. Strap 16A then passes from the keeper strap under the tank to the fourth one of fittings 14A proceeding rearwardly along the right side of the tank, i.e., the bottom edge of the tank as viewed in FIG. 5. Correspondingly, strap 17A is connected to the fourth fitting 14B from the front of the tank adjacent the right side of the tank and passes over the top of the tank to the keeper strap; the strap then passes over around the front of the tank and under the tank to the third fitting 14B from the front of the tank along the tank left side.

As seen in FIG. 4, a supplemental keeper strap 23 is provided rearwardly of keeper strap 22 to gather those of straps 16 and 17 which pass over the top of the tank from the rear of the tank. Additional supplemental keeper straps 24 are provided for additional ones of the straps as shown in FIG. 4. The supplemental keeper straps impart order to the hardness and help to prevent errors in installation of the harness.

Fittings 14A and 14B are so arranged that all of straps 16 and 17 have essentially identical effective lengths between coupling members 18 when the harness is in place and is tightened down against the tank. Preferably, the portions of the straps which pass under the tank are laid out and secured to their appropriate fittings before the tank is placed on the bed. After the tank has been placed on the bed, the harness is then passed around the front of the tank and the opposite ends of the straps are connected to appropriate ones of the fittings. The straps then are pulled through clutch devices 19 to make the straps hand tight against the tank. At this point, the straps should all be of essentially equal length.

In the foregoing descriptions, tank end 20 is that end of the tank which is disposed toward the front end of the vehicle in which the tank is transported since in the event of a crash of the vehicle, the tank would most likely tend to move forwardly relative to the vehicle. Harness 15 restrains the tank from bodily movement relative to the vehicle and to the tank supporting bed. At the moment of impact in a crash, the liquid in the tank tends to surge toward the front of the tank, thereby inducing the tank to move bodily along its supporting bed. The crash surge load of the liquid in the tank is applied to straps 16 and 17 and, via the straps, to the supporting bed for the tank. Since the straps are all of essentially uniform length, they are uniformly loaded with the result that one strap does not tend to break in preference to the others.

As noted above, it is preferred that the straps be made of woven nylon so as to be moderately elastic in nature. Therefore, the straps inherently accommodate and dissipate a substantial portion of the surge load imposed upon them during a crash. As a result, only a portion of the crash surge load is transferred to the supporting bed and is effectively restrained from movement relative to its bed. This is a particularly desirable result where the tank is transported in an airplane or helicopter, since the tank is prevented from slamming against a bulkhead in the aircraft and rupturing.

A 2000 gallon pillow tank has been effectively held in place again 8G crash loads by a harness 15 of the type described above wherein six straps 16 and six straps 17, each rated at 5000 pounds, are provided.

Harness 15 has the characteristic that the straps are separate from the tank. Therefore, as the tank tends to belly during a crash in response to a surge of the liquid within the tank, the straps can work or move relative to the tank. This assures that the straps are, in fact, uniformly loaded by the surge load imposed upon them.

FIG. 2 is a schematic top plan view of crash harness 13 engaged with tank 10, and FIG. 3 is a more detailed schematic representation of the structure and connection of one of the straps involved in harness 13. Like harness 15, harness 13 is comprised of first and second groups 25 and 26 of moderately elastic straps; preferably the straps are of the type described above with reference to harness 15. The same illustrative conventions are used in FIG. 2 as are used in FIG. 5. Fittings 14A are associated with straps 25 and fittings 14B are associated with straps 26.

The differences between harnesses 13 and 15 can best be understood by reference to FIG. 3 wherein the relation of strap 26A to the tank is illustrated in detail. Strap 26A is that strap which passes under the tank from the third fitting 14B rearwardly of tank front end 20 adjacent the tank left side, over the front end of the tank at the longitudinal centerline of the tank, and over the top of the tank to connection with a secondmost rearwardly of those of fittings 14B located along the right side of the tank. Strap 26A is comprised of three components, namely, a terminal component 27 of fixed length, a central component 28 of fixed length, and a terminal component 29 of adjustable length. Central component 28, along a major portion of its length, is vulcanized or bonded to the exterior surface of pillow tank 10; the portion of the length of strap component 28 which is bonded to the tank is represented by heavy lines in FIG. 3. A D-ring 30 is secured to each end of strap component 28. Strap component 27 is equipped at each of its ends with a snap hook 31 so that it may be connected between the tank bed and the strap central component. A snap hook 31 is also secured to one end of terminal component 29 and a second snap hook 31 is provided in a bight portion 32 of this strap component. The bight portion of component 29 is formed by passing the strap material through a strap clutch device 19 of the type described above. The strap clutch device functions as a one-way or ratcheted pulley and provides for adjustment of the length of strap 26A.

Each of straps 25 and 26 utilized in harness 13 is identical in that each strap has a central component bonded to the tank over a portion of its length, a fixed length terminal component, and an adjustable length terminal component. The central and fixed length terminal strap components are identical. Since the overall effective lengths of all of straps 25 and 26 are identical when the harness is in place, it follows that the adjustable terminal components of these straps are essentially identical.

Harness 15 has the characteristic that the harness straps cross over the front of the tank at essentially the central portion of the tank. In harness 13, however, the straps cross over the front of the tank at locations spaced across the width of the tank. It is preferred that one of each of straps 25 and 26 cross each other as they cross over the front end of the tank, as shown in FIG. 2; this arrangement of the straps on the tank permits multiple use of some of fittings 14. For example, as shown in FIG. 2 wherein five straps are provided in each of strap groups 25 and 26, the second and third fittings rearwardly of the tank front end on each side of the tank serve as connection points for a strap 25 and a strap 26.

To install harness 13, it is preferred that pillow tank 10 be placed in an empty condition on its supporting bed between the two parallel rows of fittings. The fixed length terminal strap components are then coupled to the central strap components and the position of the empty tank is then adjusted on the bed to render strap components 27 relatively taut. After the tank is filled with the desired liquid, the adjustable length strap terminal components are connected in place and are adjusted to the desired degree of tautness.

In the event of a crash, harness 13 functions in a manner essentially equivalent to the functioning of harness 15 with respect to the movement of the straps relative to the tank. The central portions of the straps utilized in harness 13 are bonded or vulcanized to the outer surface of an otherwise complete pillow tank. Thus, as the pillow tank is subjected to a surge of liquid contained therein at the moment of impact in a crash, the loading upon the straps causes the straps to shear loose from the outer surface of the tank. The fact that the straps shear loose from the tank in no way impairs the structural integrity or liquid-tightness of the tank itself. After the straps have separated from the tank, they function in exactly the same manner as the straps of harness 15 and can slip relative to the surface of the tank so that the loading imposed upon the several straps of the harness is uniform.

The structure of surge-resisting tie--down arrangement 12 is shown in FIGS. 6, 7 and 8. FIG. 6 illustrates that the structure of the tie-down arrangement repeats itself at each of multiple stations spaced uniformly longitudinally along the tank. At each station the structure of the tie-down arrangement is identical on both sides of the tank centerline 27. Accordingly, the tie-down arrangement is composed of a plurality of identical strap assemblages 35, a pair of assemblages being disposed in opposition to each other at each station along the tank. To accommodate the tie-down assemblages, a D-ring 36 for each assemblage at the station is secured to the outer top surface of the tank at each longitudinal station along the tank. Preferably, the D-rings for each pair of assemblages at a given station are combined with each other as a double D-ring member 37, shown best in FIG. 4. Also, a bed connection point fitting 14 (identified by character number 14' with respect to the tie-down arrangement to avoid confusion with the fitting provided for the crash harnesses previously described) is provided laterally of the tank adjacent each D-ring. Accordingly, a pair of D-rings (or one double D-ring) and a pair of connection point fittings 14' are provided at each longitudinal station along the tank; it is preferred that these elements be located along a common straight line disposed normal to the longitudinal centerline of the tank. Preferably, tie-down fittings 14' are identical to the tie-down fittings described above relative to crash harnesses 13 and 15.

Each strap assemblage, as shown in FIG. 7, includes a length of relatively inelastic strap material 39 equipped with a clutch device 19 (according to the previous description as, for example, an Aeroquip Corporation catalog item 31101 R-buckle) intermediate its opposite ends. Coupling means 40 are connected to one end of each strap 39 to adapt the strap for connection to D-ring 36. Preferably, the coupling means are Aeroquip Corporation catalog item 3040A snap hooks. It is also preferred that strap material 39 be woven nylon strapping of desired rated capacity of the type manufactured and marketed by Aeroquip Corporation, for example, as described above. The strap is passed through clutch device 19 to its opposite end which is connected to a D-ring 41. Preferably, the clutch device is engaged with the strap so that, when the device is in its operative mode, the distance between the device and connecting means 40 may be decreased but not increased. Each strap clutch device is provided with means for securing it to a corresponding one of fittings 14', which securing means, as shown, preferably comprises a short length of strap material 42 extending from the clutch device to a snap hook 43. Preferably, strap 42 is made of the same material as strapping 39. It is also preferred that snap hook 42 be identical to the snap hook which comprises the presently preferred form of connecting means 40.

In tie-down arrangement 12, each clutch device functions as a strap guiding pulley connected to the bed laterally of the tank, the pulley being fitted with a locking device to prevent relative movement of the pulley along the strap toward the end of the strap connected to the tank.

A length of the elastic material 44 is secured to D-ring 41, preferably by a snap hook 45 carried by a suitable loop 46 formed in the elastic material. Preferably, the elastic material is a length of Bonjii cord. For reasons more fully set forth below, it is preferred that the Bonjii cord be doubled upon itself relative to snap hook 45 so that loop 46 is actually formed at the midlength of the total length of cord between two equi-length cord legs 44'. Suitable loops 47 are formed at the ends of the cord opposite from strap 39 and suitable swivelled snap hooks 48 are secured to the cord at these loops.

A typical connection of an assemblage 35 of tie-down arrangement 12 to tank 10 is illustrated in FIG. 8. Connecting means 40 is engaged with D-ring 36 (or with double D-ring 37) to secure strap 39 of the assemblage to the tank. Snap hook 43 is engaged with the one of bed-mounted fittings 14' which lies laterally of the D-ring to which connecting means 40 is secured and which lies on the same side of the tank as the D-ring. If the tank is filled, the strap is pulled through the clutch device as tight as possible. (In the event that the tank is to be filled after the strap is engaged between D-ring 36 and fitting 14', manual tightening of the strap is delayed until the tank has been filled.) The legs of the Bonjii cord are then passed over the top of the tank past D-ring 36 to which hook 40 is connected to be connected to the bed on the opposite side of the tank. Preferably, the connection of the elastic means to the tank bed is accomplished by engaging swivel snap hooks 48 with the fittings to which snap hooks 43 of the next-adjacent opposite assemblages are also connected. That is, with reference to FIG. 6, if snap hook 43 of one of assemblages 35 is connected to fitting 14'A adjacent the left side of the tank, the swivel snap hooks associated with this same assemblage are connected to fittings 14'B, which lie on the opposite side of the tank from fitting 14'A and are associated with the tank stations on either side of the station with which fitting 14'A is associated. Similarly, the assemblage which has its snap hook 43 connected to either of fittings 14'B will have one of its swivel snap hooks 48 connected to fitting 14'A.

Bonjii cord is preferred for use in this invention as the elastic means of each assemblage 45 since this material is extremely elastic and exerts relatively constant pull for rather wide ranges of elongation. It should be understood, however, that any suitable elastic means may be used. For example, a Negator spring could be used in lieu of Bonjii cord. The length of the Bonjii cord utilized in each assemblage 35 is selected relative to the size of the tank with which the assemblage is to be used so that the cord must be extended substantially in order to be connected across the top of the tank as described above, and remains extended throughout a wide range of fullness conditions of the tank.

Elastic means comprised of two legs 44' are preferred in each assemblage 35 over a single length of Bonjii cord or other suitable elastic means. Because each assemblage must be manually connected between the tank and the tank supporting bed in the manner described above, and because the total desired force initially to be imposed upon snap hook 45 by the elastic means usually exceeds the amount of force which can conveniently be imposed upon the mechanism by a single individual, a doubled length of Bonjii cord, of selected spring rate instead of a single length of cord having double the selected spring rate, is used in the preferred embodiment of the invention illustrated in FIG. 7. Thus, it is possible for a single individual to install the tie-down arrangement between a pillow tank and its supporting bed, yet still bias the desired total preload force into each assemblage of the arrangement. Of course, if the total amount of force desired to be imposed by the elastic means upon D-ring 41 is within the range of forces which can be imposed by a single person, a single length of Bonjii cord could be used. The single length of cord could be connected to fitting 14' or to D-ring 41 associated with the opposite assemblage.

As indicated above, it is preferred that the assemblages be installed between the pillow tank and its supporting bed after the filled tank has been disposed upon the bed in the desired relation to fittings 14'. Straps 39 of each assemblage are then tightened to the greatest extent possible by hand before elastic means 44 are passed over the tank and secured to the bed. Thereafter, if a surge is induced to move longitudinally back and forth within the tank, the opposing assemblages at each station along the tank restrict bellying of the tank as the surge moves along the tank. This is the case because straps 39 cannot elongate appreciably in view of the nature of clutch devices 19 and the manner with which the straps are engaged with these devices. Since the tank cannot belly, surges moving along the tank are damped more quickly than if no tie-down arrangement were provided.

Straps 39 are inelastic in comparison to elastic means 44. Moreover, as surges tend to move within the tank, the assemblages automatically tighten themselves relative to the tank in response to the bias imposed upon straps 39 by elastic means 44. For example, consider one of the assemblages mounted between the tank and the supporting bed at the rear end of the tank. As a surge moves toward the front of the tank, the amount of liquid in the rear end of the tank is reduced and thus the strap of the assemblage at this rear tank station tends to go slack. The elastic means, however, exerts tension on the strap and the strap is taken up through clutch device 19 so that, when the surge is damped out, the tension in the strap is greater than the tension originally imposed in the strap at the time of installation of the assemblage.

The benefits provided by tie-down arrangement 12 are particularly significant when the arrangement is applied to a pillow tank used in an aircraft as a ferry range extension fuel tank. As fuel is extracted from the tank, the tie-down arrangement responds accordingly to, in effect, take up the resultant slack in the tank. The disadvantageous effects of surges moving longitudinally in an airborne pillow tank are most serious when the tank is about half full. Because the tie-down arrangement functions continuously, regardless of the degree of fullness of the tank, to resist surge-induced bellying of the tank, the effects of longitudinal surges are minimized and such surges as may be produced are damped more quickly. The anti-bellying action of the tie-down arrangement upon the tank is particularly beneficial where the tank is equipped with internal surge damping baffles of the type described in my prior United States Patent 3,288,186 because the baffles are rendered more efficient.

The tie-down arrangement and the crash restraining harnesses described above can be used independently of each other if desired. However, where a pillow tank is used as a ferry range extension fuel tank for an aircraft, it is preferred that the tie-down arrangement be used in combination with either crash harness 13 or crash harness 15. Preferably fittings 14', used to secure tie-down arrangement 12 to the bed, are identical to fittings 14, used to secure the crash harness to the bed. Accordingly, merely by providing sufficient fittings 14 at selected locations along opposite sides of the position of tank 10 on bed 11, the tie-down arrangement can readily be used in combination with an appropriate one of crash harnesses 13 or 15.

Tie-down arrangement 12 has been described above with reference to use of a pillow tank as a ferry range extension device for an aircraft since this is the presently preferred use of this structure. It will be apparent to those skilled in the art, however, that this structure can be used to advantage in other usages of pillow tanks.

The structures described above constitute presently preferred embodiments of this invention. Workers skilled in the art to which this invention pertains will readily recognize that the structures described above can be modified without departing from the scope of this invention or without sacrificing the benefits provided by these structures. Accordingly, the foregoing description should not be considered as limiting the scope of the present invention.

What is claimed is:

1. Apparatus for securing a collapsible liquid storage tank from bodily movement relative to a supporting bed in a tank transport vehicle during a crash of the vehicle comprising
   (a) first and second pluralities of straps of substantially equal length,
   (b) coupling means connected to each end of each strap for connecting each end of each strap to the bed,
   (c) each strap being passed from one end thereof along the top of the tank, around that end of the tank which is the front end in an anticipated crash, and under the tank to the strap other end,
   (d) the straps of the first plurality having the one ends thereof disposed adjacent one side of the tank and the straps of the second plurality having their one ends disposed adjacent the other side of the tank.

2. Apparatus according to claim 1 wherein the straps are fabricated of moderately elastic, high strength material.

3. Apparatus according to claim 2 wherein the straps are fabricated of woven nylon webbing.

4. Apparatus according to claim 1 wherein the straps are arranged to work and move relative to the tank during loading of the straps by the tank in a crash of the vehicle, whereby all straps are substantially equally loaded by the tank.

5. Apparatus according to claim 4 wherein the straps are seperate from the tank and are engaged with the exterior of the tank between their opposite ends, and including means holding the straps in a predetermined arrangement relative to each other and the tank.

6. Apparatus according to claim 4 wherein the apparatus includes an elongate collapsible liquid storage tank, and a frangible connection between the tank and a central portion of each strap, said frangible connection parting in response to loading upon the straps by the tank in a crash whereby the straps are movable relative to the tank.

7. Apparatus according to claim 6 wherein strap includes a first terminal component of fixed length, a second terminal component of adjustable length, and a central component of fixed length connectable between the terminal components, the central component being frangible connected to the tank along at least a portion of its length.

8. Apparatus according to claim 7 wherein the first and second terminal components and the central components of the straps are essentially identical.

9. With reference to an elongate collapsible liquid storage tank and a supporting bed for the tank, the bed being adapted to be securely fixed lengthwise in a transport vehicle for the tank and carrying fitting means arranged at locations spaced along the length of the tank adjacent the opposite sides of the tank, improved apparatus for securing the tank from bodily movement relative to the bed and the vehicle during a crash of the of the vehicle comprising
   (a) first and second corresponding pluralities of woven nylon straps of substantially equal length,
   (b) coupling means connected to each of two opposite effective ends of each strap and arranged to cooperate with the fitting means for connecting each end of each strap to the bed,
   (c) each being passed from connection at one end thereof to a selected fitting means along the top of the tank, around that end of the tank which is the front end in an anticipated crash, and under the tank to connection of the other end of the strap to another selected fitting means,
   (d) the straps of the first plurality having the one ends thereof connected to separate fitting means adjacent one side of the tank and the straps of the second plurality having their one ends connected to separate fitting means adjacent the other side of the tank, and
   (e) means holding the straps in a selected relation to each other and to the tank.

10. Apparatus for tying down a liquid-containing elongate pillow tank to a supporting bed, the apparatus comprising a plurality of substantially identical assemblages arranged in opposing pairs at spaced locations longitudinally of the tank, each assemblage comprising
    (a) an elongate relatively inelastic strap adapted at one end for connection to the tank at a selected top central location on the tank,
    (b) guide means engaged with the strap between the strap ends and adapted to be secured to the bed laterally of the selected location adjacent one side of the tank,
    (c) lock means associated with the strap at the guide means for preventing relative movement of the guide means along the strap toward the strap one end, and
    (d) extensible elastic means connected to the other end of the strap and adapted for connection relative to the bed adjacent the side of the tank opposite from the guide means,
    (e) the length of the strap and the elastic means being selected so that the elastic means must be substantially extended for connection relative to the bed.

11. Apparatus according to claim 10 wherein the elastic means is a length of Bonjii cord.

12. Apparatus according to claim 11 wherein the Bonjii cord is connected at substantially its midlength to the other end of the strap, the ends of the cord being adapted for connection to the bed at locations spaced longitudinally of the tank on opposite sides of the guide means.

13. Apparatus according to claim 10 wherein the strap is fabricated of woven nylon webbing.

14. With reference to an elongate collapsible liquid storage tank provided with a connecting point member at each of a plurality of longitudinally spaced positions centrally along the top thereof and a tank supporting bed in a transport vehicle, the bed adjacent the tank laterally of each of said spaced positions defining a connection point, a tank tie-down arrangement comprising
   (a) a plurality of relatively inelastic straps,
   (b) coupling means at one end of each strap for connecting the strap to a selected one of the connecting point members,
   (c) a strap clutch device engaged with each strap at a location along the strap spaced from the one end thereof and between the ends thereof, each clutch device being arranged for movement along the associated strap only toward said one end of the strap,
   (d) means for connecting each clutch device to the bed connection point laterally of the tank-mounted connecting point member to which the associated strap is connected,
   (e) elongate elastic means connected to the other end of each strap and extended therefrom over the tank away from the associated clutch device, and
   (f) means for connecting the ends of the elastic means opposite from the straps to selected bed connection points located adjacent the side of the tank opposite from the clutch device connecting means associated therewith, the lengths of the straps and the elastic means being selected so that the elastic means must be substantially extended from their relaxed states over a full tank for connection to said selected bed connection points.

15. In combination with an elongate liquid storage pillow tank and a tank supporting bed in a transport vehicle arranged to receive the tank lengthwise of the vehicle for the tank, the tank at locations spaced along a longitudinal centerline mounting connection fittings on the top surface thereof, the bed mounting connection fitting arranged at locations spaced along the length of the tank adjacent the opposite sides of the tank, the bed-mounted fittings including a fitting laterally of each tank-mounted fitting adjacent each side of the tank, a harness for securing the tank from bodily movement relative to the bed in a crash of the vehicle comprising
   (a) first and second pluralities of straps of substantially equal length,
   (b) coupling means connected to each end of each strap for connecting each strap between selected bed-mounted fittings,
   (c) each strap being passed from one end thereof along the top of the tank, around that end of the tank which is the front end in an anticipated crash, and under the tank to the strap other end,
   (d) the straps of the first plurality having the one ends thereof connected to bed-mounted fittings adjacent one side of the tank and the straps of the second plurality having their one ends connected to bed-mounted fittings adjacent the other side of the tank, each strap having its opposite ends connected adjacent opposite sides of the tank, and a surge-resisting tie-down arrangement for the tank comprising a plurality of substantially identical assemblages arranged in opposition to each other relative to each tank-mounted fitting, each assemblage comprising
   (e) an elongate strap connected at one end to a selected tank-mounted fitting,
   (f) guide means engaged with the strap between the ends thereof and connected to the bed-mounted fitting laterally of the selected tank-mounted fitting,
   (g) lock means associated with the guide means for preventing relative movement of the guide means along the strap toward the strap one end, and
   (h) extensible elastic means connected from the other end of the strap to the bed adjacent the side of the tank opposite from the guide means,
   (i) the length of the strap and the elastic means being selected so that the elastic means is substantially extended between the strap and the bed over the tank.

16. Apparatus according to claim 15 wherein the harness straps and the tie-down arrangement straps are fabricated of woven nylon webbing.

17. Apparatus according to claim 15 wherein some of the bed-mounted fittings to which the harness straps are connected have guide means of the tie-down arrangement connected thereto.

References Cited

UNITED STATES PATENTS

| 2,372,967 | 4/1945 | Martin | 248—361 |
| 2,851,075 | 9/1958 | Palfey | 150—.5 |
| 3,288,186 | 11/1966 | Headrick | 150—.5 |

ROY D. FRAZIER, *Primary Examiner.*

R. P. SEITTER, *Assistant Examiner.*

U.S. Cl. X.R.

150—.5; 220—1.5; 105—369; 244—135